(12) United States Patent
Chishima et al.

(10) Patent No.: US 8,655,405 B2
(45) Date of Patent: *Feb. 18, 2014

(54) MOBILE COMMUNICATION TERMINAL AND CONTROL METHOD THEREOF

(75) Inventors: Makoto Chishima, Yokohama (JP); Ryuta Fujisawa, Yokohama (JP); Tomohiro Miki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 301 days.

This patent is subject to a terminal disclaimer.

(21) Appl. No.: 12/919,401

(22) PCT Filed: Feb. 23, 2009

(86) PCT No.: PCT/JP2009/053193
§ 371 (c)(1),
(2), (4) Date: Aug. 25, 2010

(87) PCT Pub. No.: WO2009/107582
PCT Pub. Date: Sep. 3, 2009

(65) Prior Publication Data
US 2011/0006739 A1    Jan. 13, 2011

(30) Foreign Application Priority Data
Feb. 28, 2008  (JP) .................. 2008-048666

(51) Int. Cl.
*H04M 1/00* (2006.01)
(52) U.S. Cl.
USPC .............. 455/556.1; 455/127.4; 455/436; 455/558

(58) Field of Classification Search
USPC ...................................... 455/556.1
See application file for complete search history.

(56) References Cited

U.S. PATENT DOCUMENTS

| 7,991,399 B2 * | 8/2011 | Ganesan ................ 455/436 |
| 2004/0101744 A1 * | 5/2004 | Suzuki ................ 429/61 |
| 2005/0101350 A1 * | 5/2005 | Wang ................ 455/558 |
| 2005/0165916 A1 * | 7/2005 | Cromer et al. ........... 709/220 |
| 2006/0223465 A1 * | 10/2006 | Akiba et al. ............ 455/127.4 |

FOREIGN PATENT DOCUMENTS

EP   0 896 493 A2   2/1999

(Continued)

OTHER PUBLICATIONS

Dec. 23, 2011 Office Action issued in Korean Application No. 10-2010-7018955 (with translation).

(Continued)

*Primary Examiner* — Ajibola Akinyemi
(74) *Attorney, Agent, or Firm* — Oliff PLC

(57) ABSTRACT

A mobile communication terminal has a first wireless communication unit, an interface capable of detachably connecting an external apparatus, a determination unit for determining whether the external apparatus connected to the interface is a second wireless communication unit, a battery voltage detection unit for detecting battery voltage of a power supply unit, a charging detection unit, and a control unit for controlling, if the battery voltage detected by the battery voltage detection unit is lower than a first predetermined value while the charging detection unit detects the charging state, so as to prohibit concurrent use of the first wireless communication unit and the second wireless communication unit.

6 Claims, 6 Drawing Sheets

(56) References Cited

FOREIGN PATENT DOCUMENTS

| | | |
|---|---|---|
| JP | A-10-210550 | 8/1998 |
| JP | A-11-252006 | 9/1999 |
| JP | A-2002-125265 | 4/2002 |
| JP | A-2002-152837 | 5/2002 |
| JP | A-2004-187351 | 7/2004 |
| JP | A-2004-235863 | 8/2004 |
| KR | 10-2005-0018261 A | 2/2005 |

OTHER PUBLICATIONS

International Search Report dated Mar. 17, 2009 in corresponding International Application No. PCT/JP2009/053193 (with translation).

Aug. 7, 2012 Notification of Reason for Refusal issued in Japanese Patent Application No. 2010-500678 (with translation).

Feb. 12, 2013 Office Action issued in Japanese Patent Application No. 2010-500678 (with translation).

Aug. 20, 2013 Office Action issued in Japanese Patent Application No. 2010-500678 (with Concise Explanation).

* cited by examiner

MOBILE COMMUNICATION TERMINAL AND CONTROL METHOD THEREOF

CROSS REFERENCE TO RELATED APPLICATION

This application claims priority to and the benefit of Japanese Patent Application No. 2008-48666 filed on Feb. 28, 2008, the entire contents of which are incorporated herein by reference.

TECHNICAL FIELD

The present invention relates to mobile communication terminals and control methods thereof.

BACKGROUND ART

Various wireless communication systems such as PDC (Personal Digital Cellular), W-CDMA (Wideband Code Division Multiple Access), cdma2000 1x, PHS (Personal Handy-phone System), wireless LAN (Local Area Network) and Bluetooth have been operated conventionally as mobile communication systems. In addition, standardization of high-speed wireless communication such as LTE (Long Term Evolution), WiMAX (Worldwide Interoperability for Microwave Access), UMB (Ultra Mobile Broadband) has been in progress. Each of these wireless communication systems has different characteristics.

PHS, for example, has an advantage of high frequency usage efficiency as capable of taking numerous usable terminals per unit area because of its small cell area. In addition, since a PHS terminal needs to receive only individual call signals (PCH: Paging Channel) while capturing a cell station (CS) and intervals thereof are long, it has also an advantage of a long standby time. However, because the area covered by a single cell is small, there is a disadvantage of high possibility of disconnection of communication if the PHS terminal performs communication moving at a high speed.

In contrast, W-CDMA, for example, has a wide cell area and thus enables a W-CDMA terminal to communicate moving in a wide area at a high speed. However, since the W-CDMA terminal performs despread processing and the like for monitoring an incoming call and a signal level of a cell and the like, its standby time is much shorter than that of the PHS terminal.

Wireless LAN typified by widely used IEEE (Institute of Electrical and Electronic Engineers) 802.11b has its hotspots installed in coffee shops, public facilities and the like and can communicate at rates up to 11 Mbps. However, such wireless LAN is provided on the assumption of indoor use and thus a cell area thereof is small such as about 10 m in radius.

It has also been considered recently to provide a multi-mode mobile communication terminal capable of using different wireless communication systems seamlessly. For example, there is known a mobile communication terminal which changes the wireless communication systems based on a moving speed thereof or depending on a remaining battery level and a determination on length of the standby time in each of a plurality of wireless communication systems (see Patent Document 1, for example).

Patent Document 1: Japanese Patent Laid-Open No. 2004-235863

SUMMARY OF INVENTION

Technical Problem

However, the multi-mode mobile communication terminals that have been suggested are on the assumption of having a plurality of incorporated wireless communication units corresponding to the plurality of wireless communication systems.

On the other hand, there is also considered a multi-mode communication terminal as stated above configured to have a wireless communication unit of a main wireless communication system (hereinafter arbitrarily referred to as a main system) and to add a subsidiary wireless communication unit of a wireless communication system (hereinafter arbitrarily referred to as a sub-system) such as wireless LAN, Bluetooth and the like by inserting an SD card (Secure Digital Card), connecting of USB (Universal Serial Bus) and the like via an interface.

In the mobile communication terminal with such a configuration, the sub-system performs communication by receiving power supply from a battery in the mobile communication terminal in the same manner as the main system, and power consumption for communication by the sub-system is generally less than that for communication by the main system. In addition, each communication system is independent and thus capable of performing communication at the same time.

Incidentally, it is normal usage to set the terminal standby or to perform communication while the battery of the mobile communication terminal is being charged.

In order to charge the mobile communication terminal, it is necessary to satisfy a condition of a safe voltage range (for example, 2.9 to 4.2 volts) based on a characteristic of the battery. The mobile communication terminal starts charging by standard current after confirming that the condition is satisfied, whereas it stops charging if the condition is not fulfilled. Accordingly, if voltage falls lower than the safe voltage range because of increase of current consumption during charging, charging is discontinued at that point.

If the mobile communication terminal having both the main system and the sub-system is used during charging and the charging voltage is low, there is concern that charging would be discontinued because communication is performed by both of the systems and thereby a significant amount of consumption current flows and the voltage falls lower than the safe voltage range, although it would have been no problem if only one of the systems performs communication. In addition, if charging is discontinued before the battery is sufficiently charged, the battery voltage falls because of insufficient charging of the battery, causing disconnection of communication by one of or both of the main system and the sub-system.

For example, when the sub-system is initiated to perform browsing during a call by the main system, it may happen that charging is discontinued and thereby the battery voltage decreases and the power supply itself of the terminal is turned off. In this case, it may possible to continue the call by the main system if the sub-system is not initiated. Similarly, it may happen that charging is discontinued when a call is initiated by the main system during browsing by the sub-system. In this case also, it may possible to continue browsing by the sub-system if the main system is not initiated.

As set forth above, there is concern that the mobile communication terminal capable of adding the sub-system may cause an unexpected situation to a user, such as turning off the power supply of the terminal itself according to the charging voltage during charging and operation states of the main system and the sub-system.

In addition, if communication of both of the main system and the sub-system is prohibited due to potential disruption of communication regardless of the condition that one of the systems can be used singularly, it incurs inconvenience to the user by limiting opportunities to use the mobile communication terminal.

In consideration of such problems, it is an object of the present invention to provide mobile communication terminals capable of performing multi-mode communication efficiently based on the charging voltage, without interrupting communication because of unexpected disruption of charging when the user uses the mobile communication terminal during charging.

Solution to Problem

In order to achieve the above object, a mobile communication terminal according to a first aspect includes:
- a first wireless communication unit corresponding to a first wireless communication system;
- an interface capable of detachably connecting an external apparatus;
- a determination unit for determining whether the external apparatus connecting to the interface is a second wireless communication unit corresponding to a second wireless communication system and having less power consumption than the first wireless communication unit;
- a battery voltage detection unit for detecting battery voltage of a power supply unit including a battery;
- a charging detection unit for detecting a charging state; and
- a control unit for controlling, if the battery voltage detected by the battery voltage detection unit is lower than a first predetermined value while the charging detection unit detects the charging state, so as to prohibit concurrent use of the first wireless communication unit and the second wireless communication unit.

A second aspect of the present invention is that, in the mobile communication terminal according to the first aspect, the first predetermined value is a threshold of a lowest voltage which enables concurrent use of the first wireless communication unit and the second wireless communication unit when charging is discontinued.

A third aspect of the present invention is the mobile communication terminal according to the first aspect, further including a display unit for displaying that concurrent use of the first wireless communication unit and the second wireless communication unit is prohibited.

A fourth aspect of the present invention is that, in the mobile communication terminal according to the first aspect, the control unit controls so as to prohibit use of the first wireless communication unit, if the battery voltage detected by the battery voltage detection unit is lower than a second predetermined value, which is a threshold of a lowest voltage which enables to use the first wireless communication unit when charging is discontinued.

A fifth aspect of the present invention is the mobile communication terminal according to the fourth aspect, further including a display unit to display that use of the first wireless communication unit is prohibited.

A sixth aspect of the present invention is that, in the mobile communication terminal according to the first aspect, the control unit controls so as to prohibit use of the second wireless communication unit, if the battery voltage detected by the battery voltage detection unit is lower than a third predetermined value, which is a threshold of a lowest voltage which enables to use the second wireless communication unit when charging is discontinued.

A seventh aspect of the present invention is the mobile communication terminal according to the sixth aspect, further including a display unit to display that use of the second wireless communication unit is prohibited.

Advantageous Effects on Invention

According to the mobile communication terminal of the present invention, concurrent use of the first wireless communication unit and the second wireless communication unit is prohibited if the battery voltage during charging detected by the battery voltage detection unit is lower than the first predetermined value. Thereby, it is possible to effectively perform multi-mode communication based on charging voltage, without disconnecting communication due to unexpected disruption of charging.

Figure 1:
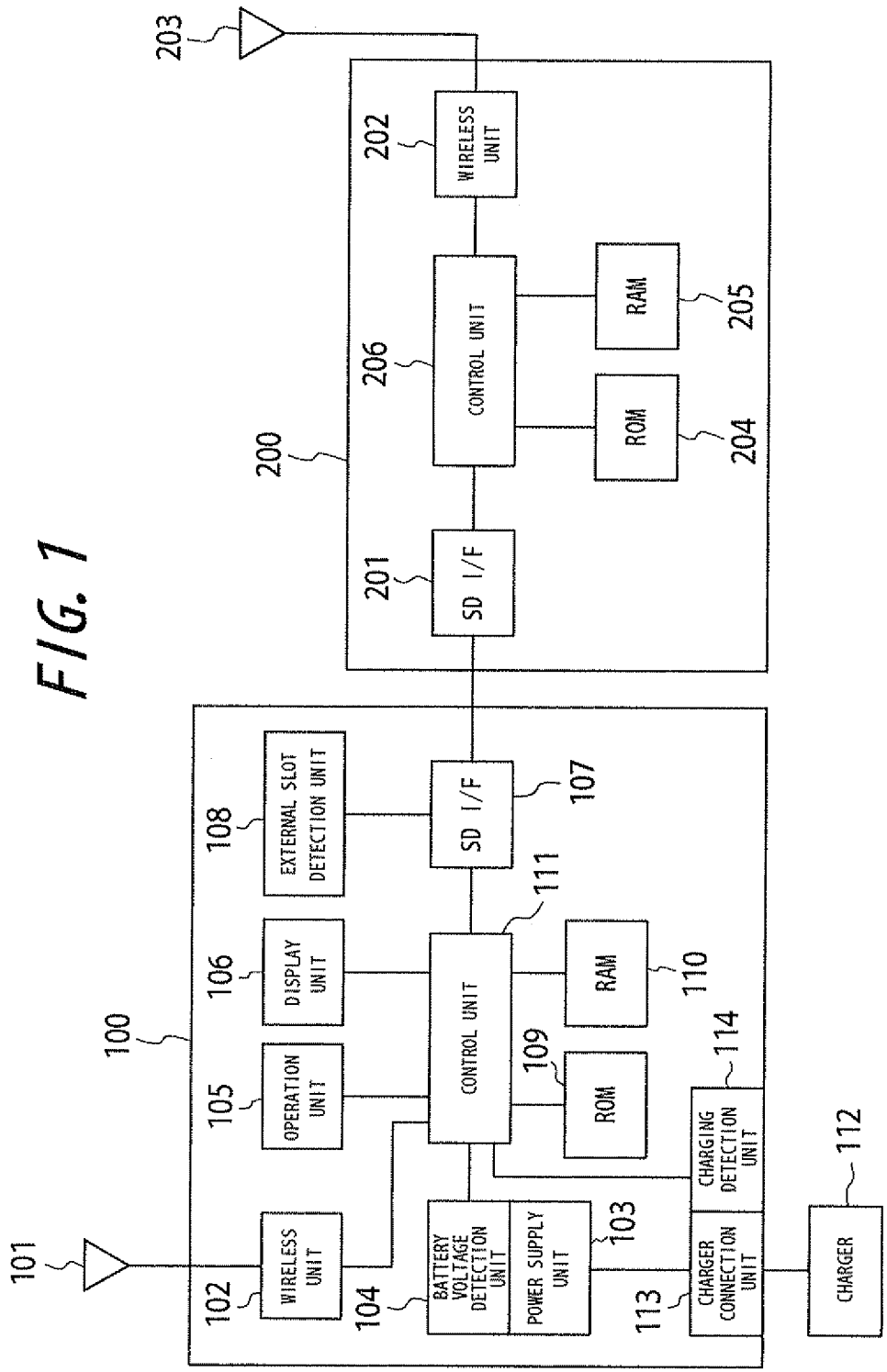
FIG. 1 is a functional block diagram illustrating a configuration of main units of a mobile communication terminal according to an embodiment of the present invention.

REFERENCE SIGNS LIST 100 mobile communication terminal
101 antenna
102 wireless unit
103 power supply unit
104 battery voltage detection unit
105 operation unit
106 display unit
107 SD I/F
108 external slot detection unit
109 ROM
110 RAM
111 control unit
112 charger
113 charger connection unit
114 charger detection unit
200 SD wireless card
201 SD I/F
202 wireless unit
203 antenna
204 ROM
205 RAM
206 control unit

DESCRIPTION OF EMBODIMENT

Embodiments of the present invention will be described with reference to the accompanying drawings.

FIG. 1 is a functional block diagram illustrating a configuration of main units of a mobile communication terminal according to an embodiment of the present invention. A mobile communication terminal 100 includes an antenna 101, a wireless unit 102, a power supply unit 103 including a battery, a battery voltage detection unit 104, an operation unit 105 such as input keys, a touch panel or the like, a display unit 106 such as LCD (Logical Crystal Display), OEL (Organic Electra Luminescence) or the like, an SD I/F 107 for inserting a card corresponding to SD I/F, an external slot detection unit 108 for detecting insertion of the card corresponding to SD I/F into the SD I/F 107, a ROM 109 and a RAM 110 on which software and the like are written, a control unit 111 for controlling overall operations, a charger connection unit 113 for connecting an external charger 112 for charging the battery in the power supply unit 103, and a charging detection unit 114 for detecting that the charger is connected to the charger connection unit.

The wireless unit 102 is a first wireless communication unit (hereinafter arbitrarily referred to as a main communication unit) corresponding to a first wireless communication system (main system) such as cdma2000 1x or W-CDMA, which are wireless communication systems provided by a carrier. The wireless unit 102 has a transmission unit, a reception unit and the like and is capable of transmitting and receiving radio waves via the antenna 101. Here, for convenience of explanation, it is assumed that the main system performs cdma2000 1x communication (hereinafter arbitrarily referred to as 1x communication) with transmission and reception.

An SD wireless card 200, as the card corresponding to the SD I/F, can be inserted into or removed from the SD I/F 107. The SD wireless card 200 corresponds to a second wireless communication system (sub-system) and has an SD I/F 201, a wireless unit 202 and an antenna 203 constituting a second wireless communication unit (hereinafter arbitrarily referred to as a sub-communication unit) for performing communication by the sub-system, a ROM 204 and a RAM 205 on which software and the like of the sub-system are written and a control unit 206 for controlling overall operations.

By being inserted into the SD I/F 107 of the mobile communication terminal 100, the SD wireless card 200 is connected to the mobile communication terminal 100 and receives power supplied from the power supply unit 103. Thereby, the sub-system can perform communication independently from the mobile communication terminal 100. Accordingly, the main communication unit and the sub-communication unit simultaneously perform communication using the same battery of the power supply unit 103. In addition, the SD wireless card 200 is designed to consume less power than the main communication unit. Here, for convenience of explanation, it is assumed that the SD wireless card 200 performs wireless LAN communication.

Figure 2:
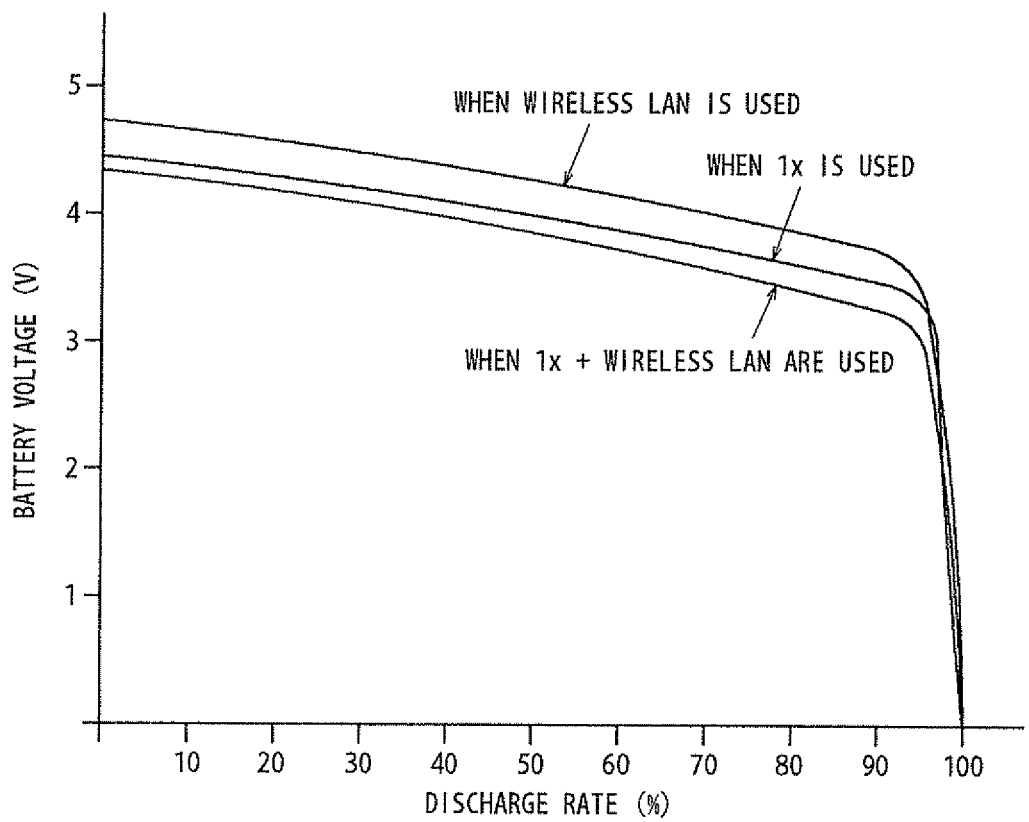
FIG. 2 is a diagram illustrating an example of a discharge rate—voltage characteristic of a battery constituting a power supply unit shown in FIG. 1.

FIG. 2 is a diagram illustrating an example of a discharge rate—voltage characteristic of the battery constituting the power supply unit 103 shown in FIG. 1. It shows the discharge rate—voltage characteristic of the battery when only the sub-communication unit performs wireless LAN communication (when wireless LAN is used), when only the main communication unit performs 1x communication (when 1x is used), and when the main communication unit performs 1x communication and the sub-communication unit performs wireless LAN communication at the same time (when 1 x+wireless LAN are used).

As shown in FIG. 2, voltage of the battery generally decreases as the discharge rate is higher, and drops further as current increases. In addition, a mobile phone terminal usually uses a lithium-ion battery with a rated voltage of 3.7V and thus a mobile phone terminal of 1x system is designed not to be able to perform communication when the battery voltage is around 3.4V and to automatically turn off the power supply of the terminal itself when the battery voltage is equal to or lower than 3.3V. Therefore, in order to show a remained battery level to the user, the mobile phone terminal of 1x system estimates the remained battery level from the battery voltage and displays it on the display unit with 1 to 3 segment(s) of a battery mark, and then displays "Low Battery" when the battery voltage is equal to or lower than 3.4V.

Figure 3:
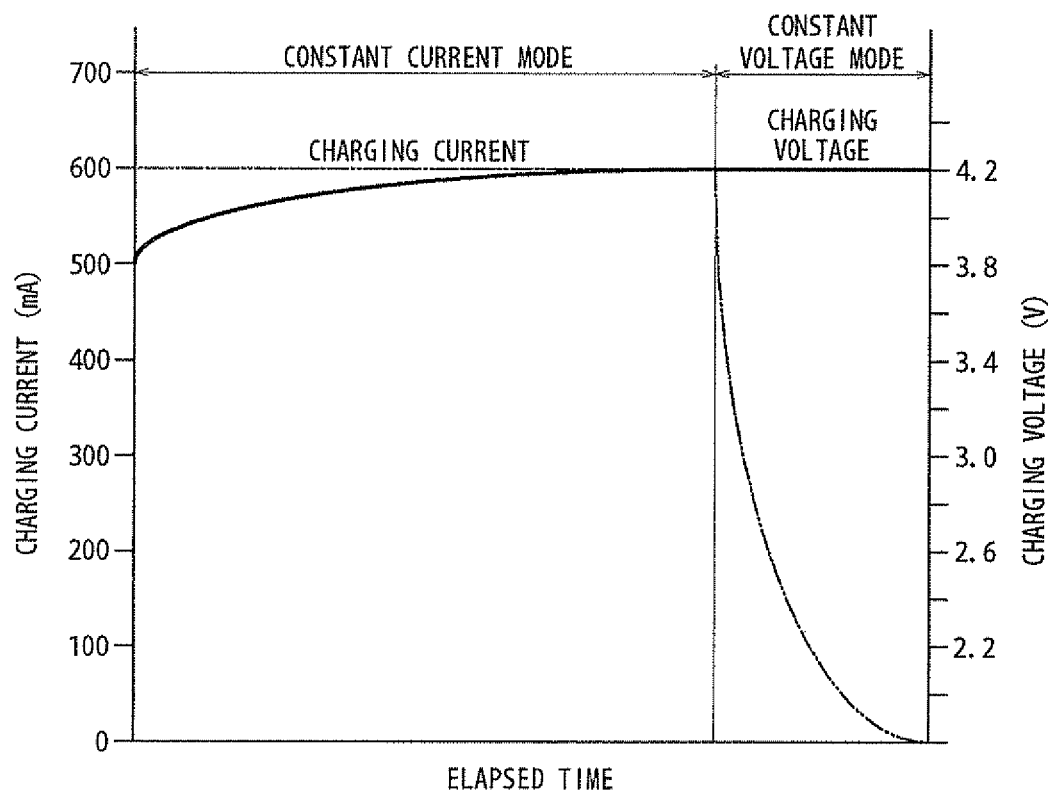
FIG. 3 is a diagram illustrating an example of a charging characteristic at charging of a battery constituting a power supply unit shown in FIG. 1.

FIG. 3 is a diagram illustrating an example of a charging characteristic of the lithium-ion battery used for the mobile communication terminal 100 according to the present embodiment. In FIG. 3, a solid line and a chain double-dashed line represent changes in the battery voltage during charging and changes in charging current, respectively. This battery needs to be charged in a safe voltage range (for example, 2.9V to 4.2V). After confirming that the battery voltage detected by the battery voltage detection unit 104 at start of charging is within the safe voltage range, the control unit 111 starts charging at a constant current mode with constant standard current (current corresponding to 70% of rated current). Thereby, if the battery voltage is lower than 4.2V, the battery voltage increases as the battery is charged more. Then, since charging at the constant current cannot be maintained once the charging voltage reaches 4.2V, which is an upper limit of the battery voltage safe range, the control unit 111 changes the charging mode to a constant voltage mode at 4.2V. The charging current gradually decreases at the constant voltage mode, and therefore the control unit 111 ends charging when the charging current is at or lower than a predetermined value (current corresponding to 1 to 10% of the rated current).

Figure 4:
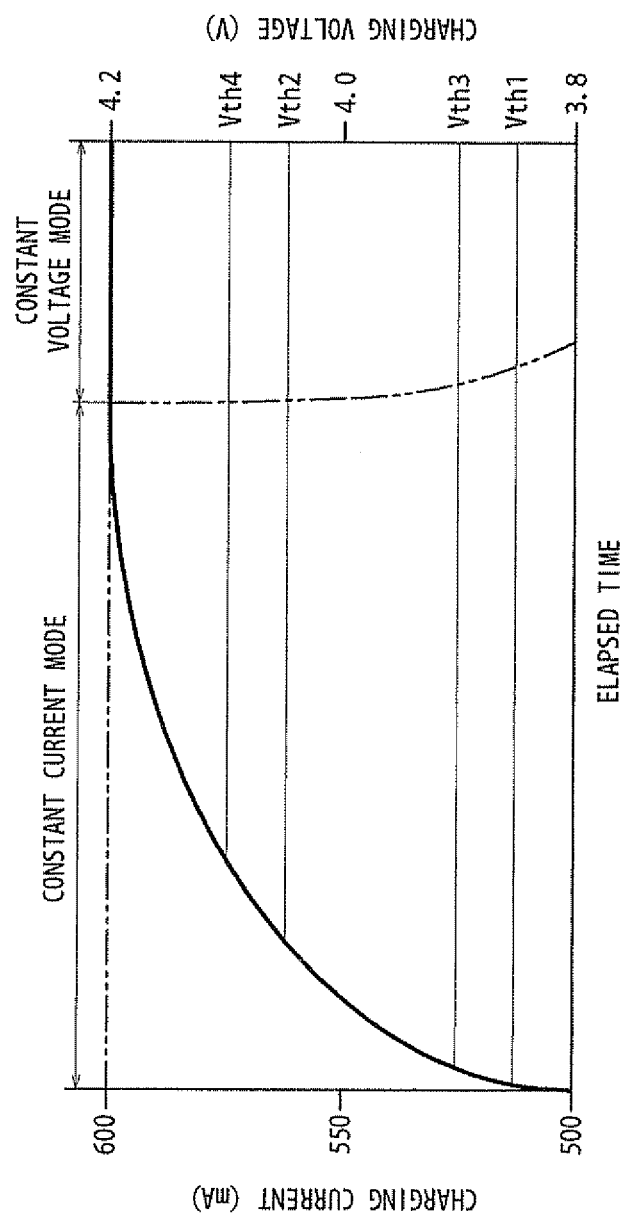
FIG. 4 is a diagram illustrating a relationship between the charging characteristic at charging and a voltage threshold shown in FIG. 3.

FIG. 4 is a diagram illustrating changes in the charging current and the charging voltage during charging the battery and voltage thresholds. A graph of the charging voltage and the charging current in this figure is a part (a part where the charging current is 500 to 600 mA and the charging voltage is 3.8 to 4.2V) of FIG. 3 enlarged in a longitudinal direction. The mobile communication terminal 100 according to the present embodiment sets a first threshold (Vth1), a second threshold (Vth2), a third threshold (Vth3) and a fourth threshold (Vth4) based on the charging state of the battery and controls enabled conditions of the main communication unit and the sub-communication unit based on comparison of the thresholds and the battery voltage detected by the battery voltage detection unit 104.

The Vth1 to Vth4 are defined as follows. Vth1 is a lowest charging voltage which enables the communication terminal to maintain a communication function when charging is discontinued. Vth2 is a lowest charging voltage which enables the main communication unit to perform communication safely even if voltage drop occurs due to inrush power at initiation of the main communication unit when charging is discontinued. Vth3 is a lowest charging voltage which enables the sub-communication unit to perform communication safely even if voltage drop occurs due to inrush power at initiation of the sub-communication unit when charging is discontinued. Vth4 is a lowest charging voltage which enables the main communication unit and the sub-communication unit to perform communication safely even if voltage drop occurs due to inrush power at simultaneous initiation of the main communication unit and the sub-communication unit when charging is discontinued. In addition, Vth4, Vth2 and Vth3 correspond to the first predetermined value, the second predetermined value and the third predetermined value, respectively.

If charging is started when the battery voltage is lower than Vth4 which cannot initiate both of the main communication unit and the sub-communication unit at once, the mobile communication terminal 100 according to the present embodiment can selectively set one of two operation modes: a main communication unit prioritizing operation mode to prioritize the main communication unit; and a selective operation mode at which a user can select the main communication unit or the sub-communication unit base on the battery voltage. The following describes each operation mode by using a flowchart.

Figure 5:
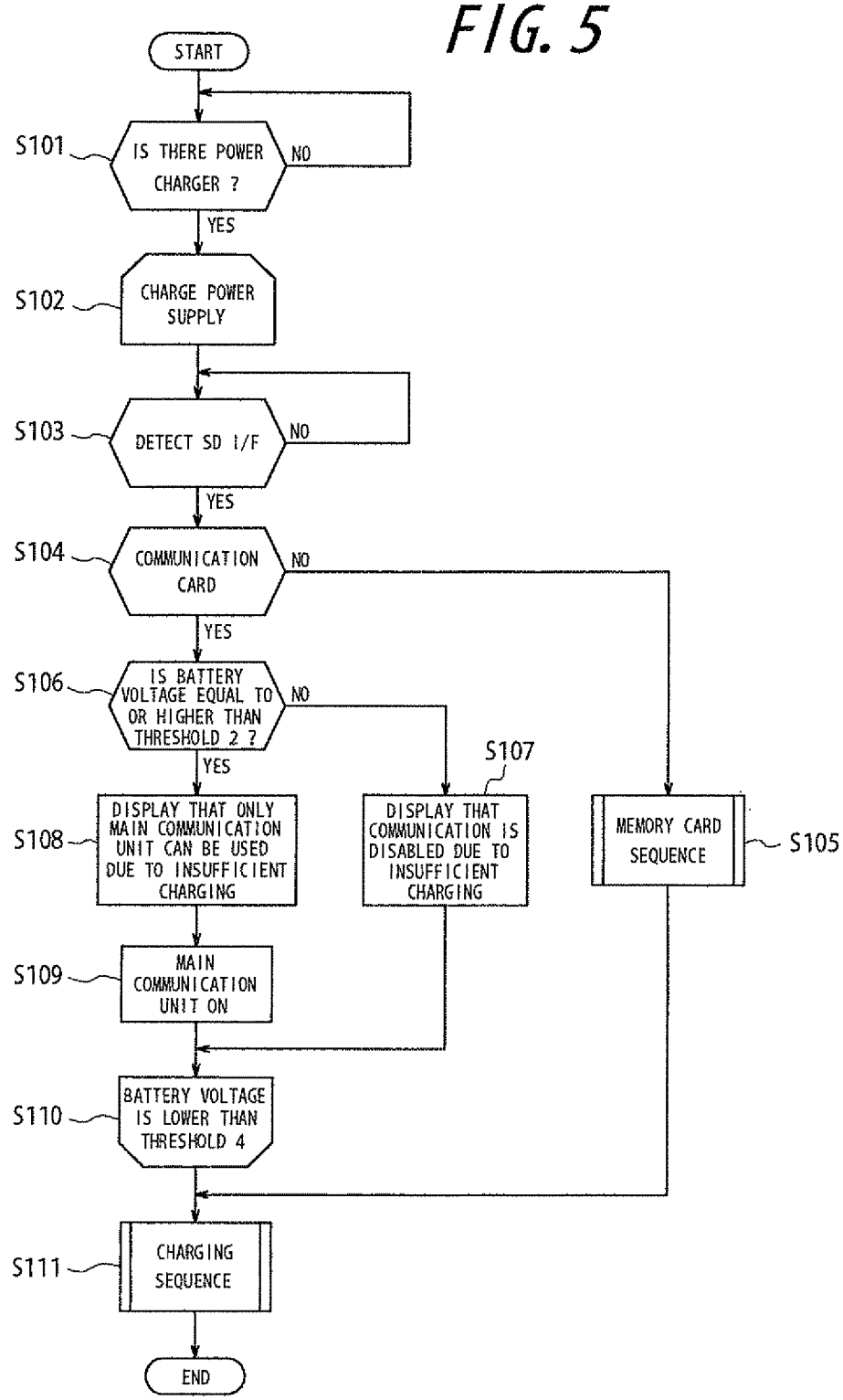
FIG. 5 is a flowchart illustrating a main communication unit prioritizing operation mode of the mobile communication terminal shown in FIG. 1.

FIG. 5 is a flowchart illustrating the main communication unit prioritizing operation mode. In this operation mode, the battery voltage at start of charging is assumed being in a range from Vth1 up to, but not including, Vth2. Therefore, the control unit 111 cannot initiate the main communication unit.

First, the control unit 111, based on output of the charging detection unit 114, monitors whether the charger 112 is connected to the charger connection unit 113 (step S101). When the connection is detected, the control unit 111 starts charging at a charging mode corresponding to the battery voltage detected by the battery voltage detection unit 104 (step S102). Here, charging is started at the constant current mode, as the battery voltage at start of charging is lower than Vth2. If the charging voltage is lower than Vth4 after start of charging, the control unit 111 controls so as to prioritize the main communication unit (steps S103 to S109). The following is a description of such prioritizing control.

First, the control unit 111 controls the external slot detection unit 108 to monitor whether the card is inserted into the SD I/F 107 (step S103), and if the insertion is detected, determines whether the card is a communication card with a wireless function (step S104). The control unit 111 includes a determination unit for determining whether an external apparatus connected to the SD I/F 107 has the sub-communication unit corresponding to the sub-system which consumes less power than the main system.

If the card is not the communication card but a memory card as a result, for example, a sequence corresponding to the memory card is operated (step S105). In contrast, if the card is the SD wireless card 200, the control unit 111 determines whether the charging voltage detected by the battery voltage detection unit 104 is equal to or higher than Vth2 (step S106).

As described above, the battery voltage at start of charging is lower than Vth2 and the charging voltage increases as the battery is charged more. When the battery voltage is lower than Vth2, the control unit 111 controls the display unit 106 to display that communication is disabled due to insufficient charging (step S107). When the battery voltage reaches Vth2 or higher, the control unit 111 controls the display unit 106 to display that the main communication unit alone can be used (step S108) and initiates the main communication unit (step S109) such that the 1x communication can be performed.

Then, when the battery is charged more and the battery voltage detected by the battery voltage detection unit 104 reaches Vth4 or higher (step S110), the control unit 111 ends the prioritizing control and shifts to a normal charging sequence (step S111) to continue charging. That is, in the charging sequence at step S111, the battery is charged at the constant current mode until the battery voltage detected by the battery voltage detection unit 104 reaches 4.2V and then charged at the constant voltage mode once the battery voltage reaches 4.2V. In this state, accordingly, the control unit 111 can initiate the wireless LAN communication and the 1x communication at the same time according to the user operation to initiate the sub-communication unit with the operation unit 105.

Accordingly, since the wireless LAN communication by the sub-communication unit cannot be initiated when the battery voltage is in a range from Vth2 up to, but not including, Vth4 during charging, it is possible to prevent an unexpected situation that the 1x communication ends abnormally as a result that voltage drop occurs by initiation of the wireless LAN communication while the 1x communication is used by the main communication unit and charging is discontinued thereby.

In addition, since the display unit 106 displays that communication is disabled when the battery voltage is lower than Vth2 and that only the main communication unit can be used when the battery voltage is in a range from Vth2 up to, but not including, Vth4, the user can know the terminal condition appropriately, which improves convenience.

Figure 6:
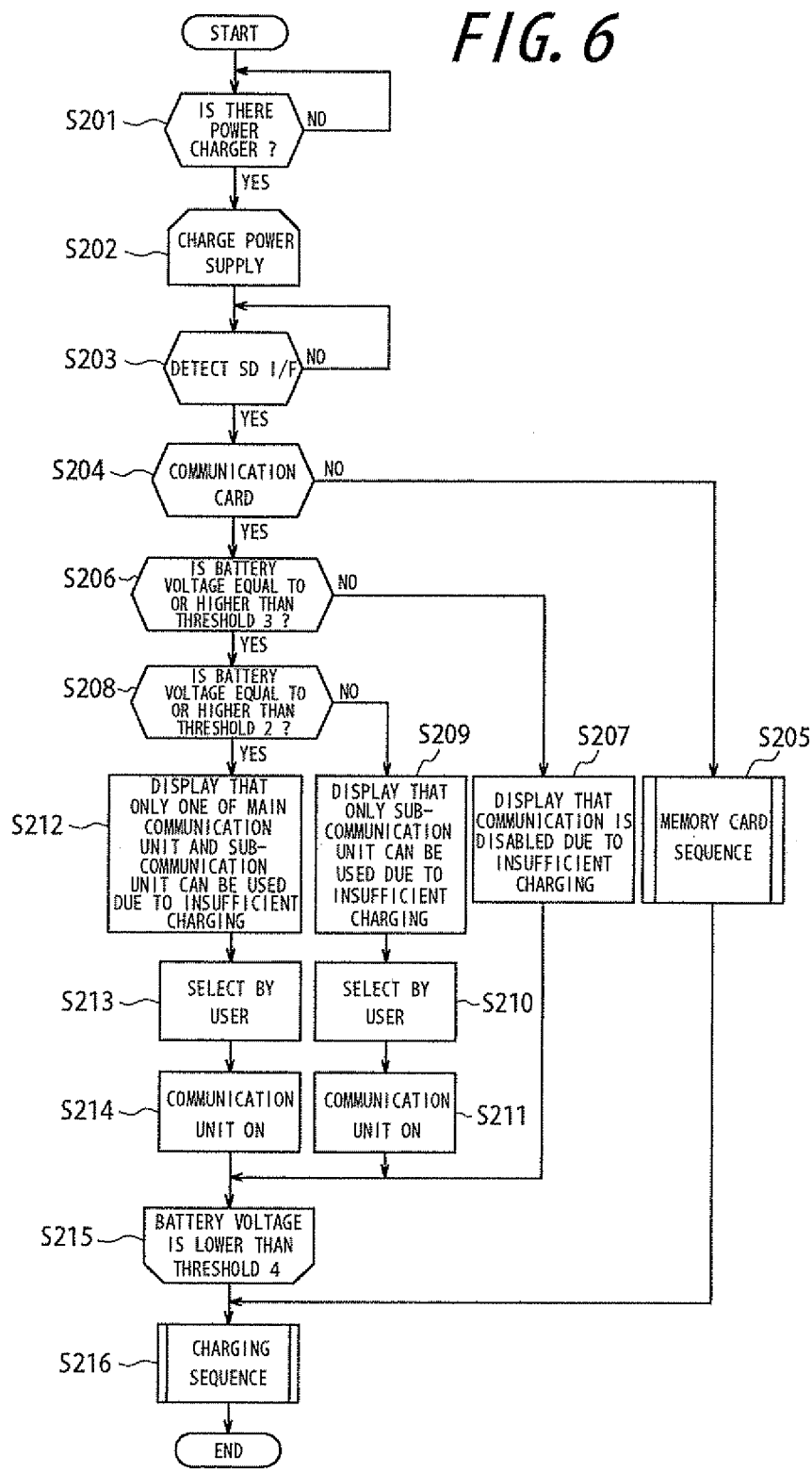
FIG. 6 is a flowchart illustrating a selective operation mode of the mobile communication terminal shown in FIG. 1.

FIG. 6 is a flowchart illustrating the selective operation mode. At this operation mode, the sub-communication unit can be selected if both of the main communication unit and the sub-communication unit cannot be initiated at the same time but only the sub-communication unit can be used, and also either one of the units can be selected if only one of the main communication unit and the sub-communication unit can be used. Here, it is assumed that the charging voltage at start of charging is in a range from Vth1 up to, but not including, Vth3. Therefore, the control unit 111 cannot initiate either the main communication unit or the sub-communication unit.

First, the control unit 111 monitors whether the charger 112 is connected to the charger connection unit 113, based on output of the charging detection unit 114 (step S201). When the connection is detected, the control unit 111 starts charging at the charging mode corresponding to the charging voltage detected by the battery voltage detection unit 104 (step S202). Since the battery voltage at start of charging is lower than Vth3 in this case, charging is started at the constant current mode. If the charging voltage is lower than Vth4 after start of charging, initiation of the main communication unit or the sub-communication unit is selectively controlled based on the battery voltage and selection by the user (steps S203 to S114). The following describes such control.

First, the control unit 111 controls the external slot detection unit 108 to detect whether the card is inserted into the SD I/F 107 (step S203), and if the insertion is detected, determines whether the card is the communication card with the wireless function (step S204).

If the card is not the communication card but the memory card as a result, for example, the sequence corresponding to the memory card is operated (step S205). In contrast, if the card is the SD wireless card 200, the control unit 111 determines whether the charging voltage detected by the battery voltage detection unit 104 is equal to or higher than Vth3 (step S206).

As stated above, the battery voltage at start of charging is lower than Vth3 and the charging voltage increases as the battery is charged more. When the battery voltage is lower than Vth3, the control unit 111 controls the display unit 106 to display that communication is disabled due to insufficient charging, that is, use of the main communication unit and the sub-communication unit is prohibited (step S207).

Then, when the battery voltage reaches Vth3 or higher, the control unit 111 determines whether the battery voltage is equal to or higher than Vth2 (step S208).

If the battery voltage is lower than Vth2, the control 111 controls the display unit 106 to display that the sub-communication system alone can be used due to insufficient charging, that is, use of the main communication system is prohibited (step S209). Then, when the user operates the operation unit 106 to select the sub-communication unit (step S210), the control unit 111 initiates the sub-communication unit (step S211) such that communication by the wireless LAN can be performed.

Subsequently, when the battery voltage reaches Vth2 or higher, the control unit 111 controls the display unit 106 to display that only one of the main communication unit and the sub-communication unit can be used due to insufficient charging, that is, to display that concurrent use of the main communication unit and the sub-communication unit is prohibited (step S212). Then, when the user operates the operation unit 106 to select one of the main communication unit and the sub-communication unit (step S213), the control unit 111 initiates the communication unit selected (step S214) and prohibits initiation of the other communication unit.

Afterward, as the battery is charged more and the battery voltage detected by the battery voltage detection unit 104 reaches Vth4 or higher (step S215), the control unit 111 ends control of the communication unit according to selection by the user and shifts to the normal charging sequence (step S216) to continue charging. In this state, accordingly, in accordance with an operation of the operation unit 105 by the user to initiate the main communication unit and the sub-communication unit, the control unit 111 can use both of the 1x communication and the wireless LAN communication at the same time or one of them singularly.

Accordingly, since only the wireless LAN communication by the sub-communication unit can be initiated when the battery voltage is in a range from Vth3 up to, but not including, Vth2 during charging, it is possible to prevent an unexpected situation that the wireless LAN communication ends abnormally as a result that voltage drop occurs by initiation of the 1x communication while the wireless LAN communication is used by the sub-communication unit and charging is discontinued thereby.

In addition, when the battery voltage is in a rage from Vth2 up to, but not including, Vth4, only one (for example, the 1x communication) of the main communication unit and the sub-communication unit can be selected. It is thus possible to prevent an unexpected situation that a selected communication ends abnormally as a result that voltage drop occurs by initiation of the other communication (for example, the wireless LAN communication) while the selected communication is used and charging is discontinued thereby.

Moreover, since the display unit 106 displays that communication is disabled when the battery voltage is lower than Vth3, that only the sub-communication unit can be used when the battery voltage is in a range from Vth3 up to, but not including, Vth2, and that only one of the main communication unit and the sub-communication unit can be used when the battery voltage is in a range from Vth2 up to, but not including, Vth4, the user can know the terminal condition appropriately, which improves convenience.

It is to be understood that the present invention is not limited to the above embodiments but may be varied or altered in a multiple of manners. For example, the communication system by the main communication unit may be not only cdma2000 1x but also cdma2000 1xEV-DO, LTE, WiMAX, UMB and other wireless communication systems for receiving data of broadcast/multicast service. In addition, the sub-system by the sub-communication unit may be not only wireless LAN but also any communication system different from the main system. Moreover, the present invention is effectively applicable when not only a single sub-communication unit but also a plurality of sub-communication units with different communication systems can be connected. Furthermore, the external apparatus is not limited to the SD-standard card but may be of any standard. The external apparatus may be not only the card but also an apparatus connected via an interface such as USB and the like. The interface is not limited to USB. If the voltage cannot be detected during charging, the voltage estimated from power and current may also be applicable.

The invention claimed is:

1. A mobile communication terminal comprising:
a first wireless communication unit corresponding to a first wireless communication system;
an interface capable of detachably connecting an external apparatus;
a determination unit for determining whether the external apparatus connecting to the interface is a second wireless communication unit corresponding to a second wireless communication system and having less power consumption than the first wireless communication unit;
a battery voltage detection unit for detecting battery voltage of a power supply unit including a battery;
a charging detection unit for detecting a charging state; and
a control unit configured to:
  (i) prohibit concurrent use of the first wireless communication unit and the second wireless communication unit when the battery voltage detected by the battery voltage detection unit is lower than a first predetermined value while the charging detection unit detects the charging state, and
  (ii) enable concurrent use of the first wireless communication unit and the second wireless communication unit when the battery voltage detected by the battery voltage detection unit is higher than or equal to the first predetermined value while the charging detection unit detects the charging state, wherein the control unit is configured to prohibit use of the first wireless communication unit when the battery voltage detected by the battery voltage detection unit is lower than a second predetermined value, the second predetermined value being a threshold of a lowest voltage which enables use of the first wireless communication unit when charging is discontinued.

2. The mobile communication terminal according to claim 1, wherein the first predetermined value is a threshold of a lowest voltage which enables concurrent use of the first wireless communication unit and the second wireless communication unit when charging is discontinued.

3. The mobile communication terminal according to claim 1, further comprising a display unit for displaying that concurrent use of the first wireless communication unit and the second wireless communication unit is prohibited.

4. The mobile communication terminal according to claim 1, further comprising a display unit to display that use of the first wireless communication unit is prohibited.

5. A mobile communication terminal comprising:
a first wireless communication unit corresponding to a first wireless communication system;
an interface capable of detachably connecting an external apparatus;
a determination unit for determining whether the external apparatus connecting to the interface is a second wireless communication unit corresponding to a second wireless communication system and having less power consumption than the first wireless communication unit;
a battery voltage detection unit for detecting battery voltage of a power supply unit including a battery;
a charging detection unit for detecting a charging state; and
a control unit configured to:
  (i) prohibit concurrent use of the first wireless communication unit and the second wireless communication unit when the battery voltage detected by the battery voltage detection unit is lower than a first predetermined value while the charging detection unit detects the charging state, and (ii) enable concurrent use of the first wireless communication unit and the second wireless communication unit when the battery voltage detected by the battery voltage detection unit is higher than or equal to the first predetermined value while the charging detection unit detects the charging state, wherein, the control unit is configured to prohibit use of the second wireless communication unit when the battery voltage detected by the battery voltage detection unit is lower than a third predetermined value, the third predetermined value being a threshold of a lowest voltage which enables use of the second wireless communication unit when charging is discontinued.

6. The mobile communication terminal according to claim 5, further comprising a display unit to display that use of the second wireless communication unit is prohibited.

* * * * *